(12) United States Patent
Hirota et al.

(10) Patent No.: US 6,976,726 B2
(45) Date of Patent: Dec. 20, 2005

(54) OUTSIDE HANDLE DEVICE FOR A VEHICLE DOOR

(75) Inventors: Koichi Hirota, Takahama (JP); Norikazu Kobayashi, Chita (JP); Yuichi Watanabe, Tokyo (JP); Yoshimi Nakatani, Tokyo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/772,343

(22) Filed: Feb. 6, 2004

(65) Prior Publication Data

US 2004/0227374 A1 Nov. 18, 2004

(30) Foreign Application Priority Data

Feb. 7, 2003 (JP) .............................. 2003-031776

(51) Int. Cl.[7] .............................................. B60J 5/00
(52) U.S. Cl. .................... 296/146.1; 343/713
(58) Field of Search ...................... 296/146.1; 343/713; 292/336.3, 347, 348–355

(56) References Cited

U.S. PATENT DOCUMENTS 6,046,510 A * 4/2000 Kawanobe et al. ...... 296/146.1
6,795,032 B2 * 9/2004 Ieda et al. .................. 343/713
2003/0063037 A1 * 4/2003 March et al. ............... 343/713
2004/0251709 A1 * 12/2004 Kobayashi et al. ...... 296/146.1
2005/0057408 A1 * 3/2005 Asakura et al. ............. 343/713

FOREIGN PATENT DOCUMENTS

| DE | 101 63 778 A1 | 1/2003 |
| EP | 1 108 835 A2 | 6/2001 |
| JP | 2000-255342 A | 9/2000 |
| JP | 2002-30844 A | 1/2002 |

\* cited by examiner

*Primary Examiner*—Jason Morrow
(74) *Attorney, Agent, or Firm*—Buchanan Ingersoll PC

(57) ABSTRACT

An outside handle device for a vehicle door comprises a handle main body provided at the outside of the vehicle door, a handle frame fixed to the vehicle door, a first connector provided at a vehicle body side and electrically connected with an electric signal cable at the vehicle body side, and a second connector provided at the handle main body and electrically connected with the electric component accommodated in the handle main body. The first connector and the second connector are placed with a predetermined distance when the handle main body is assembled in the handle.

7 Claims, 5 Drawing Sheets

OUTSIDE HANDLE DEVICE FOR A VEHICLE DOOR

CROSS REFERENCE TO RELATED APPLICATIONS

This application is based on and claims priority under 35 U.S.C. §119 with respect to a Japanese Patent Application 2003-031776, filed on Feb. 7, 2003, the entire content of which is incorporated herein by reference.

FIELD OF THE INVENTION

This invention generally relates to an outside handle device and a connector used for the outside handle device.

BACKGROUND OF THE INVENTION

Recently, for a door of a vehicle, an electrically operated door lock device and wireless remote controlled door lock device and so on have been used to improve convenience of the door opening/closing operation. In these devices, a connector, which supplies power between a module and a unit of the vehicle without contacting, is known (for example, see the document disclosed in Japanese Patent Laid-Open Publication No. 2000-255342, p3–5, FIG. 4).

According to the disclosed art, the known art refers to a power supply in trunk lid, wherein an inverter device is provided for generating alternate current using a battery as a power source and a primary coil is connected to its output side. A trunk lid lamp placed adjacent to the primary coil includes a tail lamp and a secondary coil for supplying power to the lamp. Thus, when the trunk lid is under closed position, the secondary coil faces to the primary coil and a core with narrow gap to make electrical contact by basis of electromagnetic induction.

For the above electric power supply system using electromagnetic induction, a door opening/closing system and so on are applied as electrical components for the vehicle. The disclosure for the known art has been adopted only for application of power supply method using electromagnetic induction to simplify for wiring wire harness and to improve productivity in attachment. Namely, the known art has been only a system for supplying electric power instead of disclosing a concrete example for signal transmission.

On the other hand, it is common that electric power or signal is supplied or transmitted to various electric parts (e.g. antenna) provided in an outside handle device by wiring a wire harness. One of the known art for wiring the wire harness is described as follows.

First, an antenna 51 and one end of a wire harness 52 (shown in FIG. 5) are connected under disassembled condition. Next, the antenna 51 is fixed to inside of the outside handle 50, and the other end of the wire harness 52 is inserted through a small aperture 50*a* provided in the vehicle front side of the outside handle 50 (upper direction of FIG. 5).

Then, a terminal 52*a* connected to the other end of the wire harness 52 is disposed into a connector 53. The connector 53 is inserted through an aperture 60*a* provided in a door panel 70 and a handle frame 60, and an outside handle 50 is attached to the handle frame 60.

Meanwhile, a wire harness 72 connected with door lock electric inner parts is extended near the handle frame 60. The wire harness 72 is to be electrically connected to the wire harness 52. At this time, a protector 90 or a sub-wire harness formed by rubber tube is necessary to protect the wire harness 72 to prevent an undesirable contact with a moving door glass 80. Then, a worker in the assembly plant connects each connector 53, 73 together using hand. Finally, the connected connectors 53, 73 are manually engaged with a detent means (not shown) provided in the handle frame 60.

When a smart-key system on a vehicle door or an electrical latch cancellation system and so on are equipped, a built-in transmitter has to be housed inside of the outside handle or the handle frame which supports the outside handle. FIG. 6 shows the relationship between a door lock ECU provided in the vehicle body side and various electrical (electronic) components provided in the outside handle device. Both FIGS. 5 and 6 show that a number of wire connections is necessary fqr both parts (the vehicle and the outside handle). Accordingly, thickening of wire harness wired from the outside handle 50, or a complicated wiring operation of the wire harness is unavoidable in inside of the door.

Additionally, in the known art, wiring wire harness, workability for removing the wire harness 52 from the outside handle 50 is not considered. Further, assembling operation can not be carried out smoothly since the worker or operator has to insert the connector 53 through aperture 60*a* manually. In addition, the connector inserting operation and the wiring/engaging operation of the wire harness 52, 72 had to be carried out by error and trial since there is a region which can not be seen directly in some portions. In addition, since positioning relationship between the outside handle 50 and the door lock is different depending on the types of vehicle, it has been required to design wire harnesses 52, 72 for every vehicle type, and accordingly, different parts are required for every vehicle type.

SUMMARY OF THE INVENTION

In light of foregoing, according to an aspect of the present invention, an outside handle device for a vehicle door comprises a handle main body provided at the outside of the vehicle door for accommodating an electrical component, a handle frame fixed to the vehicle door for supporting the handle main body, a door lock mechanism provided in the vehicle door, a first connector provided at a vehicle body side and electrically connected with an electric signal cable at the vehicle body side, and a second connector provided at the handle main body and electrically connected with the electric component accommodated in the handle main body.

The first connector includes a primary coil to supply an electric power and a vehicle body side signal transmission device. The second connector includes a secondary coil to receive the electric power and a handle main body side signal transmission device. The first connector and the second connector are placed with a predetermined distance when the handle main body is assembled in the handle frame.

The electric power is supplied from the first connector to the second connector with non-contacting condition using the primary coil and the secondary coil, and a wireless signal transmission is carried out between the first connector and the second connector using the vehicle body side signal transmission device and the handle main body side signal transmission device.

It is preferable that a connector, which is provided at a vehicle body side and a handle main body assembled to handle frame, supplying a electric power and transmitting signal between the vehicle body side and the handle side, includes a first connector comprising a primary coil for supplying the electric power and a vehicle body side signal transmission device, attachable to designated place of the vehicle body side, a second connector comprising a secondary coil for accepting the electric power and a handle main body side signal transmission device, attachable to designated place of the handle main body.

The first connector and the second connector are placed with a predetermined distance when the handle main body is assembled in the handle frame. The electric power is supplied from the first connector to the second connector with non-contacting condition using the primary coil and the secondary coil, and a wireless signal transmission is carried out between the first connector and the second connector using the vehicle body side signal transmission device and the handle main body side signal transmission device.

It is still further preferable that the vehicle body side signal transmission device and the handle main body side signal transmission device transmit signal each other with infrared signal. The handle main body side signal transmission device includes at least an emitting device, and the vehicle body side signal transmission device includes at least an acceptance device.

It is still further preferable that the connector includes an electric power acceptable an additional secondary coil presented on a door glass put between the first connector and the second connector with non-contacting condition and presented at corresponding position to the primary coil and the secondary coil when the first connector is attached to the vehicle body side and the second connector is attached to the handle side, and a operating condition indicator illuminated by a electric power accepted at the additional secondary coil.

BRIEF DESCRIPTION OF THE DRAWING FIGURES

The foregoing and additional features and characteristics of the present invention will become more apparent from the following detailed description considered with reference to the accompanying drawing figures wherein:

FIG. 4($b$) is a front view of a door glass of FIG. 4($a$);

DETAILED DESCRIPTION OF THE INVENTION

A preferred embodiment of the present invention will be described hereinbelow in detail with reference to the accompanying drawings.

Figure 1:
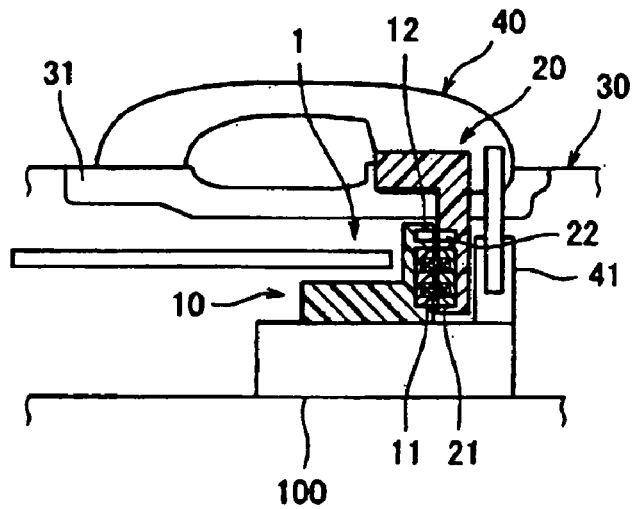
FIG. 1 is a cross sectional view schematically illustrating a configuration of an outside handle device according to a first embodiment of the present invention.
Figure 2:
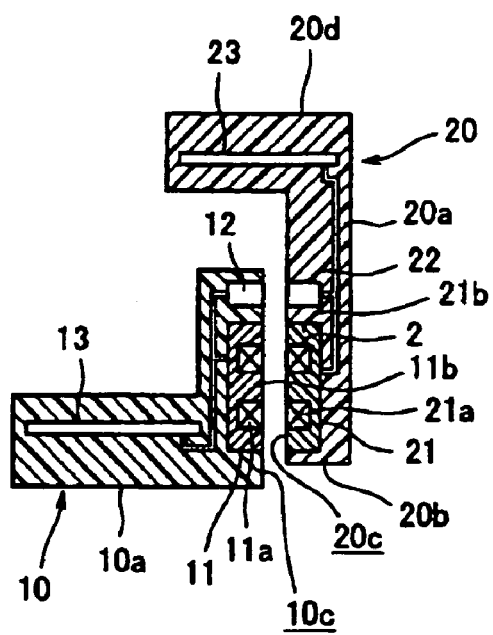
FIG. 2 is a cross sectional view schematically illustrating a connector of the outside handle device shown in FIG. 1.
Figure 3:
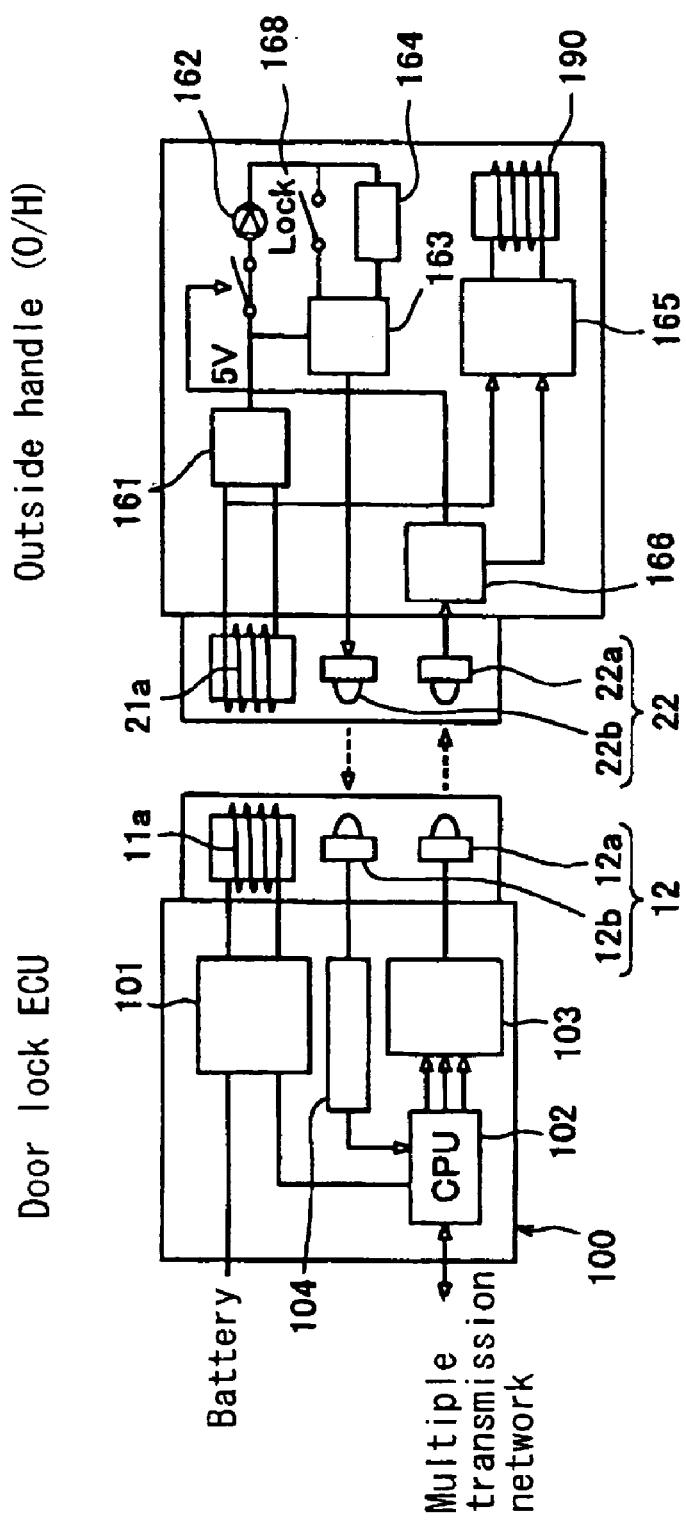
FIG. 3 is a circuit block diagram of a connector circuit of FIG. 2.

A first embodiment of the present invention is explained referring to FIGS. 1 to 3.

As shown in FIG. 1, an outside handle device according to the first embodiment of the present invention includes a handle frame 31 of a door 30, an outside handle (handle main body) 40 built in the door 30 and a connector 1 for supplying electric power and transmitting signal between a vehicle body side and the outside handle side.

The connector 1 includes of a first connector 10 attached to the vehicle body side of the door 30 (door lock mechanism) and a second connector 20. The first connector 10 includes a coil core 11 for supplying electric power and a door-side infrared emitting/accepting device 12 (a vehicle body side signal transmission device). The second connector 20 includes a coil core 21 provided in the outside handle 40 for receiving the electric power and a handle-side infrared emitting/accepting device 22 (a handle side signal transmission device).

When the outside handle is attached to the handle frame 31, both the first connector 10 and the second connector 20 are arranged to face each other with narrow distance. Accordingly, the power supply between the first connector 10 and the second connector 20 is carried out without contacting with a primary coil 11$a$ and a secondary coil 21$a$, and wireless signal transmission using infrared between the first connector 10 and the second connector 20 is carried out with vehicle body side signal transmission device 12 and handle side signal transmission device 22.

As shown in FIG. 1, the first connector 10 is attached to the vehicle body side of the door 30 (a door lock mechanism) using a screw (not shown) or any other fastening device, and the second connector 20 is attached to the outside handle 40 using also a fastening device such as a screw (not shown).

A key cylinder 41 is attached to the outside handle 40 in addition to the second connector 20. When the outside handle 40 is inserted into the aperture of the door 30, the key cylinder 41 and the second connector 20 are also inserted into the inside of the door handle frame. In this condition, the outside door handle 40 is rigidly fixed with the handle frame 31 of the door 30 using screws (not shown) and so on.

When the outside handle 40 is attached to the handle frame 31, the key cylinder 41 is simultaneously engaged with a key rotor (not shown). Therefore, the door locking/unlocking operation can be mechanically performed by rotating the key cylinder 41 using a key from outside of the door 30.

As shown in FIG. 2, the first connector 10 includes a connector body 10$a$ made of resin and possessing an L-shape as viewed from the top, and a door lock ECU 100 (see FIG. 1) is provided at one side of the connector body 10$a$. The connector body 10$a$ is attachable to the vehicle body side (the door lock mechanism). The coil core 11 and the infrared emitting/accepting device 12 are attached to a connector opposed face 10$c$ of the connector body 10$a$. The coil core 11 includes the primary coil 11$a$ for supplying electric power and a core body 11$b$ made of ferrite material or the like wherein the primary coil 11$a$ is placed suitably. The infrared emitting/accepting device 12 is connected with an infrared transmitting/receiving device (not shown).

A printed circuit board 13 is provided near the coil core 11 and the infrared emitting/accepting device 12. An electric circuit (not shown) on the board and the primary coil 11$a$ and the infrared emitting/accepting device 12 are connected to the infrared transmitting/receiving device.

On the other hand, the second connector 20 is provided with a connector body 20$a$ made of resin and possessing an L-shape as viewed from top. A base 20$d$ of the connector body 20$a$ is attachable to the outside handle 40, and a standing portion 20$b$ projects into the inner side of the vehicle from the outside handle 40.

The coil core 21 and the infrared emitting/accepting device 22 are attached to a connector opposed face 20$c$ in the standing portion 20b of the second connector 20. The coil core 21 includes the secondary coil 21a for supplying electric power and a core body 21b made of ferrite material and so on wherein the secondary coil 21a is placed suitably. The infrared emitting/accepting device 22 is connected with an infrared transmitting/receiving device (not shown). A printed circuit board 23 is provided near the coil core 21 and the infrared emitting/accepting device 22. An electric circuit (not shown) on the board and the secondary coil 21a and the infrared emitting/accepting device 22 are connected to the infrared transmitting/receiving device.

When the first connector 10 with door lock ECU 100 is attached to a designated place of the vehicle body side (the door lock mechanism) and the second connector 20 is attached to the outside handle 40, each connector opposed face 10c, 20c of the connectors 10, 20 is arranged to face each other with a narrow distance.

Since each connector opposed face (10c, 20c) is arranged in this manner, the primary coil 11a of the first connector 10 and the secondary coil 21a of the second connector 20 are also arranged to face each other with a narrow distance. The infrared emitting/accepting device 12 of the first connector 10 and the infrared emitting/accepting device 22 of the second connector 20 are also arranged to face each other with a narrow distance.

On the other hand, a power cable, a ground cable and a multiple transmission network form a bundle of signal cables. The door lock ECU 100 is fixed to the vehicle body side (door lock mechanism) integrally with the first connector 10 and is connected to the bundle of signal cables.

Hereinafter, an electric circuit composition of the connector 1 will be described with a circuit block diagram shown in FIG. 3. A switching circuit 101 is included in the door lock ECU 100, alternating current (AC) voltage generated in the switching circuit 101 is applied to the power discharging trans coil 11a (the primary coil). With applying the alternating current, an AC voltage is generated in the secondary coil 21a in the outside handle 40 by an electromagnetic induction. This generated AC voltage is converted to direct current (DC) voltage by a rectification circuit 161 made of diodes and others, and the DC voltage is supplied to each electric part.

A CPU 102 provided in the door lock ECU 100 is connected with the multiple transmission network by an interface (not shown) to exchange signals with the vehicle body side for door locking/unlocking operation or a smart-key system. When the CPU 102 receive a signal from the multiple transmission network, the signal is transmitted to an infrared emitting device 12a via a signal transmitter circuit 103, hereby, the signal is transmitted to an infrared accepting device 22a provided in the outside handle 40. Furthermore, when the signal is transmitted from an infrared emitting device 22b provided in the outside handle 40, an infrared acceptance device 12b provided in the door lock ECU 100 receives the signal, and the signal data is inputted to the CPU 102 after demodulating in a receiver circuit 104.

On the other hand, the DC voltage generated in a rectification circuit 161 of the outside handle 40 is supplied to an LED 162 for illuminating and a transmitter circuit 163. When a door lock switch 168 is pushed or a door unlock sensor 164 is operated, a signal is transmitted from the infrared emitting device 22b to the infrared acceptance device 12b of the door lock ECU 100 via the transmitter circuit 163. It is noted here that, the door lock switch 168 is a manual switch to manually lock the door, and the door unlock sensor 164 is a switch which detects a change of capacitance by approaching of a human body or by touching the handle.

On the other hand, the received AC voltage at the secondary coil 21a is inputted to a modulator circuit 165 as a carrier signal. At the same time, the signal from CPU 102 of the door lock ECU is inputted to a receiving circuit 166 via the infrared acceptance device 22a, modulated to modulation wave, and then transmitted to an antenna 190 of a smart-key system.

The antenna 190 is of a transmitter antenna type to transmit a signal which requests a certification to a key carried by an owner of the vehicle for door opening/closing operation. Accordingly, the antenna 190 can transmit and receive a signal with key taken by the user with wireless. Since electric power is supplied from the door lock ECU side to the electric circuit of the outside handle without contacting, wireless communication is carried out between the key (not shown) and the antenna 190. Therefore, the user can operate locking or unlocking by only operating the key instead of gripping the outside handle directly.

By supplying electric power with the basis of electromagnetic induction, not only attaching of the outside handle 40 can be simplified but also the circuit can be simplified since a carrier generation circuit for a smart-key system is no more necessary.

As described above, the non-contacting connector with electromagnetic induction and the infrared two-way communication are used in the first embodiment of the present invention. Therefore, electric power is supplied from the door to the outside handle 40, at the same time, transmission from the door 30 to the outside handle 40 or from the outside handle 40 to the door 30 can be carried out. The door opening/closing system using smart-key can be easily carried out.

Accordingly, electric connection can be carried out by attaching the outside handle 40 to the handle frame 31 of the door 30 from the outside of the vehicle.

In the known art, transmission of electric power and signals between a vehicle body side and an outside handle has been carried out using only wiring the wire harness. On the contrary, in the first embodiment of the present invention, a picking up operation of the wire harness from the outside handle can be omitted. Additionally, a connector inserting operation at workability-lacked place, a wiring operation of the wire harness and fixing operation can be omitted.

Additionally, common parts can be used even when the alignment of both the outside handle and the vehicle body side (the door lock mechanism) is not unified. It makes an electric connecting operation between the outside handle and the vehicle body side easy.

Additionally, when the shape of the outside handle is standardized while various vehicle types, common parts related with the present invention can be used even while different vehicle types since the wire harness is not wired in the outside handle.

Figure 4:
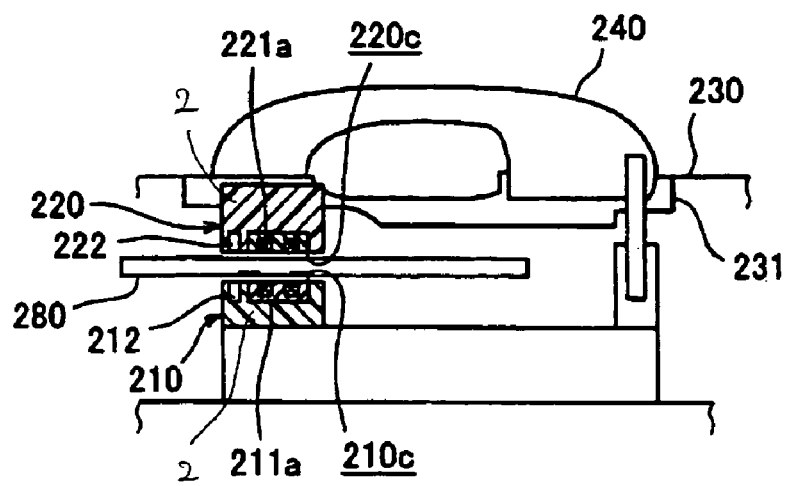
FIG. 4($a$) is a cross sectional view schematically illustrating a configuration of an outside handle device according to a second embodiment of the present invention.
Figure 4:
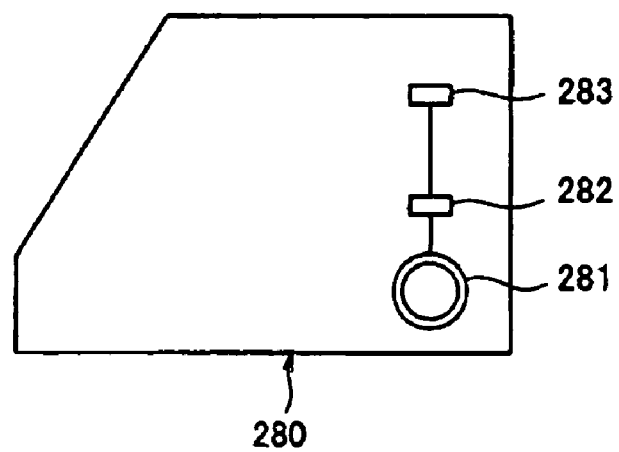
Figure 5:
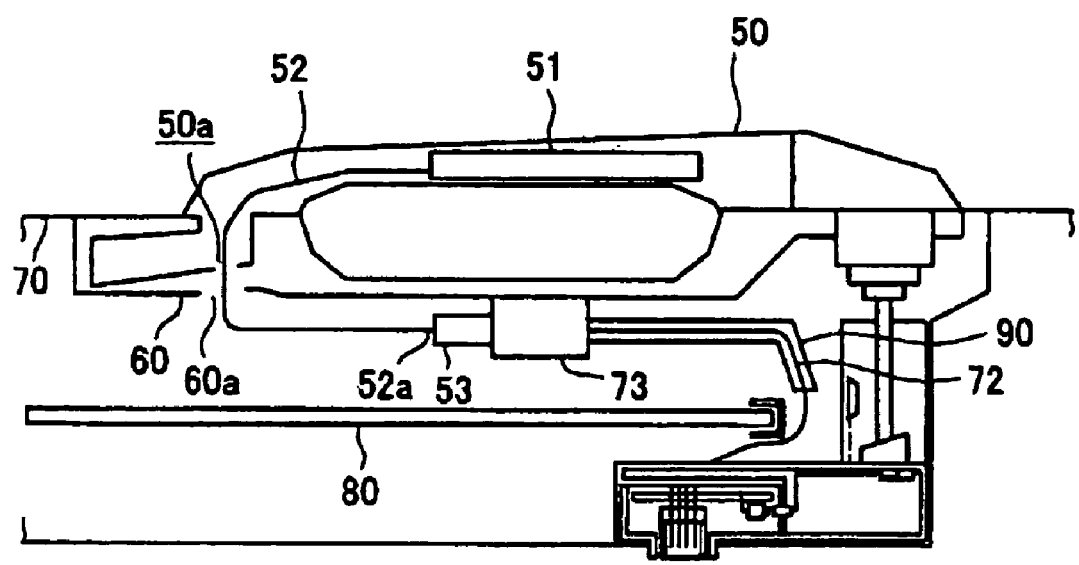
FIG. 5 is a cross sectional view schematically illustrating a known connecting portion of door and door outside handle.
Figure 6:
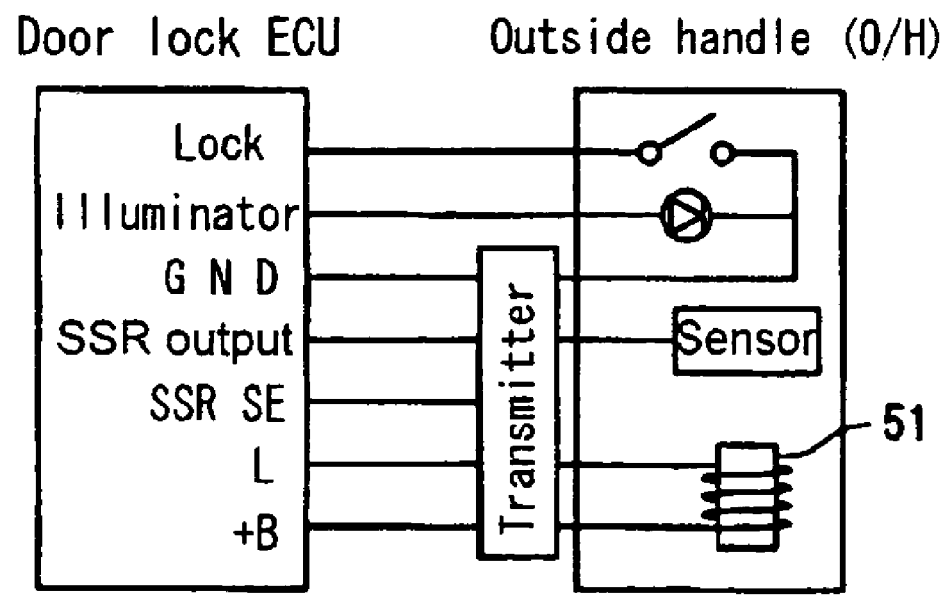
FIG. 6 is a circuit block diagram of electrically connecting portion of FIG. 5.

A second embodiment of the present invention is explained referring to FIG. 4.

For the same composition which is equivalent to the first embodiment, the detailed description is omitted and corresponding number is put to FIG. 4.

As shown in FIG. 4(a), an outside handle device according to the second embodiment of the present invention includes a handle frame 231 of a door 230, an outside handle (handle main body) 240 built in the door 230, a door lock mechanism provided at a side of a vehicle and a connector 2 attached them. The connector 2 consists of a first connector 210 attached to vehicle body side of the door 230 (the door lock mechanism), a second connector 220 attached to the outside handle 240 and a secondary coil 281 lied between the first connector 210 and the second connector 220. The first connector 210 and the second connector 220 are placed as face to face. The distance between first connector 210 and the second connector is broader than that of the first embodiment, and a door glass 280 is put between them.

Non-contacting electric power supply can be carried out from the first connector 210 to the second connector 220 by a set of a primary coil 211a and a secondary coil 221a as same as the first embodiment. Accordingly, wireless signal transmission between both connectors can be carried out by a set of infrared emitting/accepting device 212, 222.

On the other hand, as shown in FIG. 4(b), a secondary coil (additional secondary coil) 281 made of conductive material is provided on lower part of the door glass 280. The provided position of the secondary coil 281 is just intermediate between the primary coil 211a of the first connector and the secondary coil 221a of the second connector 220. Thus, the secondary coil 281 receives a leakage flux of a magnetic induction generated between the primary coil 211a and the secondary coil 221a.

Additionally, the secondary coil 281 placed on the door glass surface is connected to a rectification circuit 282 made of diode and a LED 283. The LED 283 is attached on upper part of the door glass 280 as shown in FIG. 4(b). It is possible to use the LED 283 as an illumination. The LED 283 can be lighted with synchronizing with a switching circuit. In addition, the LED 283 can be effectively used as security lighting by placing the LED 283 higher position of the door glass 280. Additionally, the LED 283 can be used as an operation indicator of a smart-key system and an illuminator. According to this composition, door locking/unlocking condition can be confirmed instantly, and forgetting of door locking operation can be prevented.

Additionally, in the common method for wiring a wire harness, when an outside handle is attached to a door, the wiring operation of the harness and the connector engaging operation are very difficult since a door glass has been accommodated in the door. For the above-mentioned embodiments, workability of assembling operation can be improved gradually since burdensome operation is omitted.

The principles, a preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An outside handle device for a vehicle door, comprising:
    a handle main body provided at the outside of the vehicle door for accommodating an electrical component;
    a handle frame fixed to the vehicle door for supporting the handle main body;
    a first connector provided at a vehicle body side and electrically connected with an electric signal cable at the vehicle body side; and
    a second connector provided at the handle main body and electrically connected with the electric component accommodated in the handle main body; wherein
    electric power is supplied from the first connector to the second connector with non-contacting condition, and a wireless signal transmission is carried out between the first connector and the second connector using a vehicle body side signal transmission device and a handle main body side signal transmission device.

2. An outside handle device for a vehicle door according to claim 1, wherein the first connector includes a primary coil to supply electric power and a vehicle body side signal transmission device.

3. An outside handle device for a vehicle door according to claim 1, wherein the second connector includes a secondary coil to receive the electric power and a handle main body side signal transmission device.

4. An outside handle device for a vehicle door according to claim 1, wherein the first connector and the second connector are placed with a predetermined distance when the handle main body is assembled in the handle frame.

5. A connector provided at a vehicle body side and a handle main body assembled to a handle frame, supplying electric power and transmitting signal between the vehicle body side and the handle side,
    comprising:
    a first connector comprising a primary coil for supplying the electric power and a vehicle body side signal transmission device, attachable to a designated place of the vehicle body side;
    a second connector comprising a secondary coil for accepting the electric power and a handle main body side signal transmission device, attachable to a designated place of the handle main body; wherein
    the first connector and the second connector are placed with a predetermined distance when the handle main body is assembled in the handle frame; and
    the electric power is supplied from the first connector to the second connector with non-contacting condition using the primary coil and the secondary coil, and a wireless signal transmission is carried out between the first connector and the second connector using the vehicle body side signal transmission device and a handle main body side signal transmission device.

6. A connector used for an outside handle device according to claim 2, wherein the vehicle body side signal transmission device and the handle main body side signal transmission device transmit signals between each other with an infrared signal, the handle main body side signal transmission device comprising at least an emitting device, and the vehicle body side transmission device comprising at least an acceptance device.

7. A connector used for an outside handle device according to claim 3, further comprising an electric power acceptable additional secondary coil presented on a door glass between the first connector and the second connector with non-contacting condition and presented at corresponding position to the primary coil and the secondary coil when the first connector is attached to the vehicle body side and the second connector is attached to the handle side, and an operating condition indicator illuminated by a electric power accepted at the additional secondary coil.

* * * * *